(12) United States Patent
Young et al.

(10) Patent No.: US 11,097,508 B2
(45) Date of Patent: Aug. 24, 2021

(54) POLYMERIC MULTILAYER MATERIAL AND METHOD OF MAKING THE SAME

(71) Applicant: 3M INNOVATIVE PROPERTIES COMPANY, St. Paul, MN (US)

(72) Inventors: Jacob D. Young, St. Paul, MN (US); Jeffrey O. Emslander, City of Grant, MN (US); Jeffrey P. Kalish, Pt. Paul, MN (US); Diane L. Emslander, City of Grant, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 77 days.

(21) Appl. No.: 16/347,373

(22) PCT Filed: Nov. 27, 2017

(86) PCT No.: PCT/US2017/063246
§ 371 (c)(1),
(2) Date: May 3, 2019

(87) PCT Pub. No.: WO2018/102249
PCT Pub. Date: Jun. 7, 2018

(65) Prior Publication Data
US 2020/0262176 A1    Aug. 20, 2020

Related U.S. Application Data

(60) Provisional application No. 62/429,407, filed on Dec. 2, 2016.

(51) Int. Cl.
*B32B 5/18*     (2006.01)
*B29C 48/00*    (2019.01)
(Continued)

(52) U.S. Cl.
CPC .............. *B32B 5/18* (2013.01); *B29C 48/022* (2019.02); *B29C 48/10* (2019.02); *B29C 48/21* (2019.02);
(Continued)

(58) Field of Classification Search
CPC ....... B29C 48/022; B29C 48/10; B29C 48/21; B29K 2023/065; B29K 2033/12;
(Continued)

(56) References Cited

U.S. PATENT DOCUMENTS 9,689,096 B2    6/2017   Berrigan

FOREIGN PATENT DOCUMENTS

| CN | 101952498 | 1/2011 |
| CN | 103415391 | 1/2013 |

(Continued)

OTHER PUBLICATIONS

Cheney, "Investigation of Expandable Polymeric Microspheres for Packaging Applications", Technical Report Natick/TR-12/020—U. S. Army Natick Soldier Research, Development and Engineering Center, Jun. 2012, pp. 48.

(Continued)

*Primary Examiner* — Lawrence D Ferguson
(74) *Attorney, Agent, or Firm* — Adrian L. Pishko (57) ABSTRACT

Polymeric multilayer material includes an adhesive layer having first and second opposed major surfaces. A first foam layer is joined to the first major surface and includes a first plurality of expandable microspheres. A first skin layer is attached to the first foam layer and is free of the first plurality expandable microspheres. A second foam layer is joined to the second major surface of the internal adhesive layer and includes a second plurality of expandable microspheres dispersed therein. A second skin layer is attached to the second foam layer and is free of the second plurality of (Continued)

expandable microspheres. A portion of the first expandable microspheres of the first foam layer and of the second foam layer is at least partially embedded within the adhesive layer. Embodiments, of polymeric multilayer materials described herein are useful, for example, as wearable medical or athletic support components. The materials can also be used as protective wrappings. For example, the materials can be wrapped around a sharp corner of an article, building, etc.

14 Claims, 5 Drawing Sheets (51) Int. Cl.
| | |
|---|---|
| B29C 48/10 | (2019.01) |
| B29C 48/21 | (2019.01) |
| B32B 5/14 | (2006.01) |
| B32B 7/12 | (2006.01) |
| B32B 25/04 | (2006.01) |
| B32B 25/14 | (2006.01) |
| B32B 27/06 | (2006.01) |
| B32B 27/32 | (2006.01) |
| C08J 9/32 | (2006.01) |
| B29K 23/00 | (2006.01) |
| B29K 33/00 | (2006.01) |
| B29K 105/00 | (2006.01) |
| B29K 105/04 | (2006.01) |

(52) U.S. Cl.
CPC ........... *B32B 5/145* (2013.01); *B32B 7/12* (2013.01); *B32B 25/045* (2013.01); *B32B 25/14* (2013.01); *B32B 27/065* (2013.01); *B32B 27/32* (2013.01); *C08J 9/32* (2013.01); *B29K 2023/065* (2013.01); *B29K 2033/12* (2013.01); *B29K 2105/0097* (2013.01); *B29K 2105/048* (2013.01); *B32B 2250/05* (2013.01); *B32B 2250/24* (2013.01); *B32B 2250/40* (2013.01); *B32B 2264/0228* (2013.01); *B32B 2266/0242* (2013.01); *B32B 2266/104* (2016.11); *B32B 2307/72* (2013.01); *B32B 2419/00* (2013.01); *B32B 2437/00* (2013.01); *B32B 2535/00* (2013.01); *B32B 2571/00* (2013.01); *C08J 2201/03* (2013.01); *C08J 2203/22* (2013.01); *C08J 2333/10* (2013.01)

(58) Field of Classification Search
CPC ...... B29K 2105/0097; B29K 2105/048; B32B 2250/05; B32B 2250/24; B32B 2250/40; B32B 2264/02; B32B 2264/0228; B32B 2266/0242; B32B 2266/025; B32B 2266/0264; B32B 2266/0278; B32B 2266/104; B32B 2307/536; B32B 2307/54; B32B 2307/72; B32B 2307/732; B32B 2419/00; B32B 2437/00; B32B 2535/00; B32B 2571/00; B32B 25/045; B32B 25/14; B32B 27/065; B32B 27/308; B32B 27/32; B32B 27/36; B32B 27/40; B32B 5/145; B32B 5/18; B32B 7/02; B32B 7/12; C08J 2201/03; C08J 2203/22; C08J 2323/06; C08J 2323/12; C08J 2333/06; C08J 2333/10; C08J 2367/04; C08J 2375/04; C08J 9/32
See application file for complete search history.

(56) References Cited

FOREIGN PATENT DOCUMENTS

| | | |
|---|---|---|
| CN | 105051137 | 11/2015 |
| CN | 105934466 | 9/2016 |
| DE | 102012109964 | 4/2014 |
| JP | 2015-003944 | 1/2015 |
| WO | WO 2008-065454 | 6/2008 |
| WO | WO 2012/129045 | 9/2012 |
| WO | WO 2015/116958 | 8/2015 |
| WO | WO 2016-094235 | 6/2016 |

OTHER PUBLICATIONS

International Search Report for PCT International Application No. PCT/US2017/063246, dated Feb. 23, 2018, 4 pages.

POLYMERIC MULTILAYER MATERIAL AND METHOD OF MAKING THE SAME

CROSS REFERENCE TO RELATED APPLICATIONS

This application is a national stage filing under 35 U.S.C. 371 of PCT/US2017/063246, which claims the benefit of U.S. Application No. 62/429,401, filed Dec. 2, 2016, the disclosure of which is incorporated by reference in its/their entirety herein.

BACKGROUND

Polymeric multilayer films are known in the art, and are used in a variety of applications. The particular construction, including composition of the various layers can influence the properties of the film, and the usefulness of the film for various applications.

SUMMARY

In one aspect, the present disclosure provides a polymeric multilayer material. The polymeric multilayer material includes an adhesive layer having first and second opposed major surfaces. A first foam layer is joined to the first major surface and includes a first plurality of expandable microspheres dispersed therein. A first skin layer is attached to the first foam layer and is substantially free of (i.e., only up to 4 wt. % (i.e., 0 wt. % to 4 wt. %)) the first plurality expandable microspheres. A second foam layer is joined to the second major surface of the internal adhesive layer and includes a second plurality of expandable microspheres dispersed therein. A second skin layer is attached to the second foam layer and is substantially free of (i.e., only up to 4 wt. % (i.e., 0 wt. % to 4 wt. %)) the second plurality of expandable microspheres. A portion of the first expandable microspheres of the first foam layer and of the second foam layer is at least partially embedded within the adhesive layer.

In another aspect, the polymeric multilayer material includes a pressure sensitive adhesive layer having a first major surface and an opposing second major surface. A first foam layer having a first plurality of expandable microspheres dispersed therein is joined to the first major surface of the internal adhesive layer. The expandable microspheres of the first foam layer are in a range from 4 wt. % to 8 wt. % of the first foam layer, based on the total weight of the first foam layer. The polymeric multilayer material further includes a first skin layer substantially free of the first plurality of expandable microspheres of the first foam layer. The first skin layer is attached to the first foam layer to define a first external surface of the polymeric multilayer material. The polymeric multilayer material further includes a second foam layer having a second plurality of expandable microspheres dispersed therein. The second foam layer is joined to the second side of the internal adhesive layer. The second plurality expandable microspheres of the second foam layer are in a range from 4 wt. % to 8 wt. % of the second foam layer, based on the total weight of the second foam layer. The polymeric multilayer material further includes a second skin layer that is substantially free of the second plurality of expandable microspheres in the second foam layer and that is attached to the second foam layer to define a second external surface of the polymeric multilayer material. In some embodiments, a portion of the first plurality of expandable microspheres of the first foam layer is at least partially embedded within the adhesive layer and a portion of the second plurality of expandable microspheres of the second foam layer is at least partially embedded within the adhesive layer.

In yet another aspect, a method of forming a polymeric multilayer material includes coextruding a plurality of layers to form a coextruded precursor polymeric multilayer material. The plurality of layers a first extrudable feedstock including an adhesive. The plurality of layers further includes a second extrudable feedstock including a first polymer component. In the first polymer component, 4 wt. % to 25 wt. % of the first polymer component is expandable microspheres, based on the total weight of the second extrudable feedstock. The plurality of layers still further includes a third extrudable feedstock including a second polymer component. The second polymer component is substantially free of (i.e., only up to 4 wt. % (i.e., 0 wt. % to 4 wt. %)) the microspheres of the first extrudable feedstock. The method includes forming an annular blown film from the coextruded precursor polymeric multilayer material. The method further includes collapsing the annular blown film to form a polymeric multilayer material described herein.

Various exemplary embodiments of the present disclosure offer certain advantages, at least some of which are unexpected. For example, in some embodiments, the skin layer allows for various modifications to the polymeric multilayer material after formation. In some embodiments, an adhesive or backing can be attached to at least one skin layer. In some embodiments, the polymeric multilayer material can be adapted to be a wearable article.

Further, in some embodiments, the first skin layer and second skin layer can help to increase the expandable microsphere content in the polymeric multilayer material. That is, Applicants have found that at relatively high loadings (e.g., at least 4 wt. % expandable microspheres in the foam layer) materials without the skin layers have certain manufacturing defects. For example, the expandable microspheres can build up on an annular die during the blowing stage. The expandable microspheres then come off in relatively big portions leaving defects in the foam, when the polymeric multilayer material was formed, however, to include the skin layers, the expandable microspheres are largely retained in the first and second foam layers. The use of skins to allow production of a high quality reduced density structure than would not be possible without the skins and the increased microsphere content can increase resiliency of the material. Additionally, the first and second skin layers add a certain degree of stiffness to the polymeric multilayer material, which is tunable based on the properties of the material forming the first and second skin layers.

In some embodiments, the thickness of the polymeric multilayer film can advantageously and significantly exceed conventional thickness limitations in blown film via high density reduction (e.g., a limit of 1500 micrometers). That is, by collapsing the blown film and including an adhesive layer on the internal surface a thicker composite material can be formed than is possible through standard extrusion of a single layer. In some embodiments, a blown film process for making polymeric multilayer film utilizing an annular die reduces corrugation defects in the film resulting from using a cast an extrusion process. In some embodiments forming the polymeric multilayer film using a blown film process can be beneficial because the resulting material will be symmetrical which can result in less curl during lamination.

Embodiments, of polymeric multilayer materials described herein are useful, for example, as wearable medical or athletic support components. The materials can also be used as protective wrappings. For example, the materials can be wrapped around a sharp corner of an article, building, etc.

BRIEF DESCRIPTION OF THE DRAWINGS

In the drawings, which are not necessarily drawn to scale, like numerals describe substantially similar components throughout the several views. The drawings illustrate generally, by way of example, but not by way of limitation, various embodiments discussed in the present document.

DETAILED DESCRIPTION

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section.

In the methods described herein, the acts can be carried out in any order without departing from the principles of the disclosure, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The polymers described herein can terminate in any suitable way. In some embodiments, the polymers can terminate with an end group that is independently chosen from a suitable polymerization initiator, —H, —OH, a substituted or unsubstituted ($C_1$-$C_{20}$) hydrocarbyl (e.g., ($C_1$-$C_{10}$)alkyl or ($C_6$-$C_{20}$)aryl) interrupted with 0, 1, 2, or 3 groups independently selected from —O—, substituted or unsubstituted —NH—, and —S—, a poly(substituted or unsubstituted ($C_1$-$C_{20}$)hydrocarbyloxy), and a poly(substituted or unsubstituted ($C_1$-$C_{20}$)hydrocarbylamino).

Figure 1:
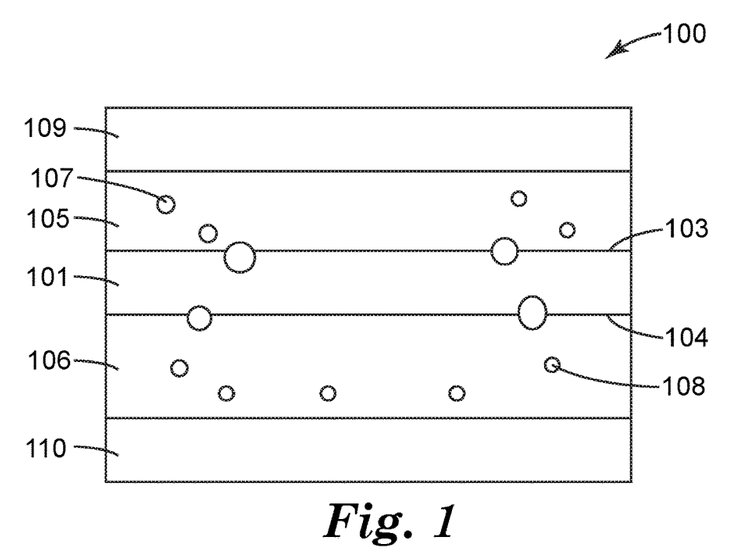
FIG. 1 is a schematic view of an exemplary polymeric multilayer material described herein.
Figure 2:
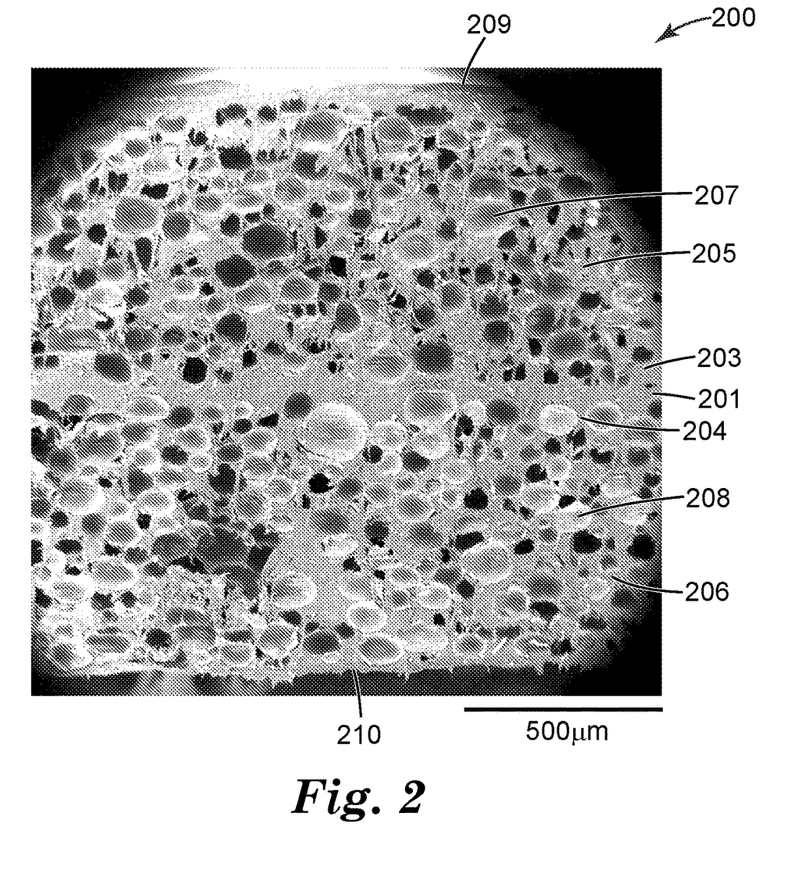
FIG. 2 is a scanning electron microscope (SEM) digital image at 170× of Example 1.

FIG. 1 is a schematic depiction of a cross-section of exemplary polymeric multilayer material described herein 100. FIG. 2 is a SEM image showing a cross-section of Example 1 polymeric multilayer material 200. Both figures will be discussed concurrently. As shown, polymeric multilayer material 100, 200 includes adhesive layer 101, 201, which is located substantially in the middle of polymeric multilayer material 100, 200. Adhesive layer 101, 201 includes first major surface 103, 203 and second major surface 104, 204, which are opposed to each other.

Polymeric multilayer material 100, 200 further includes first foam layer 105, 205. First foam layer 105, 205 is attached to adhesive layer 101, 201 and includes first plurality of expandable microspheres 107, 207 dispersed therein. First skin layer 109, 209 is attached to first foam layer 105, 205. First skin layer 109, 209 defines a first external surface of the polymeric multilayer material. First skin layer 109, 209 is substantially free of the first plurality of expandable microspheres 107, 207. That is, first skin layer 109, 209 contains only up to 4 wt. % (i.e., 0 wt. % to 4 wt. %) of first plurality of expandable microspheres 107, 207, based on the total weight of first skin layer 109, 209.

Polymeric multilayer material 100, 200 further includes second foam layer 106, 206. Second foam layer 106, 206 is attached to adhesive layer 101, 201 and includes second plurality of expandable microspheres 108, 208 dispersed therein. Second skin layer 110, 210 is attached to second foam layer 106, 206. Second skin layer 110, 210 defines a second external surface of polymeric multilayer material 100, 200. Second skin layer 110, 210 is substantially free of second plurality expandable microspheres 108, 208. That is, second skin layer 110, 210 contains only up to 4 wt. % (i.e., 0 wt. % to 4 wt. %) of second plurality of expandable microspheres 108, 208, based on the total weight of the second skin layer 110, 210.

A portion of first expandable microspheres 107, 207 of first foam layer 105, 205 is at least partially embedded within adhesive layer 101, 201 and a portion of second expandable microspheres 108, 208 of second foam layer 106, 206 are at least partially embedded within adhesive layer 101, 201. A surface area of each microsphere embedded in the adhesive layer can be in a range from 1% surface area to 100% surface area (in some embodiments, 10% surface area to 90% surface area, 20% surface area to 80% surface area, 30% surface area to 70% surface area, or even 40% surface area to 60% surface area). This forms an undulating boundary between each of first foam layer 105, 205 and second foam layer 106, 206. That is, a portion of adhesive layer 101, 201 contacts a portion of first and second pluralities of expandable microspheres 107, 207 and 108, 208, respectively. Additionally, a portion of adhesive layer 101, 201 contacts another portion of each first and second foam layers 105, 205 and 106, 206, respectively. Each layer of polymeric multilayer material 100 can account for the same or a different weight percent of the total weight of polymeric multilayer material 100 as well as the same or a different thickness of the total thickness of polymeric multilayer material 100. Additionally, each layer can independently be formed from the same or different material or combination of materials.

In some embodiments, the adhesive layer is in a range from 2% to 20% of the total polymeric multilayer material thickness (in some embodiments, 5% to 15% of the total polymeric multilayer material thickness or even 6% to 8% of the total polymeric multilayer material thickness). The adhesive layer can have a thickness in a range from 5 micrometers to 250 micrometers (in some embodiments, 10 micrometers to 150 micrometers, 15 micrometers to 100 micrometers, or even 20 micrometers to 40 micrometers).

In addition to containing as adhesive, the adhesive layer may also include a tackifier. For example, in some embodiments, the adhesive layer contains adhesive in a range from 50 wt. % to 100 wt. % (in some embodiments, 60 wt. % to 90 wt. %, or even 70 wt. % to 80 wt. %) of the adhesive layer, based on the total weight of the adhesive layer. The adhesive can be any one of a number of pressure sensitive adhesives or non-pressure sensitive adhesive. Examples of suitable pressure sensitive adhesives include at least one of a natural rubber-based adhesive, a synthetic rubber based adhesive, a styrene block copolymer-based adhesive, a polyvinyl ether-based adhesive, a poly(methyl acrylate)-based adhesive, a polyolefin-based adhesive, or a silicone-based adhesive. As used herein, an adhesive that is "based" on a particular component means that the adhesive includes at least 50 wt. % of the particular component, based on the total weight of the adhesive. An exemplary adhesive is available under the trade designation "KRATON MD6748" from Kraton, Houston, Tex.

Suitable non-pressure sensitive adhesives include those that "self-bond" or "block" at the temperature at which the polymeric multilayer material is extruded. Examples of suitable non-pressure sensitive adhesives include very low-density polyethylene resins such as that available, for example, under the trade designation "INFUSE 9507" from Dow Chemical Company, Midland, Mich., or ethylene copolymer resins with high co-monomer content such as a high vinyl acetate containing ethylene vinyl acetate resin.

In exemplary embodiments where the polymeric multilayer material includes a tackifier, the tackifier can be present in a range from 10 wt. % to 60 wt. % (in some embodiments, 20 wt. % to 50 wt. %, or even 30 wt. % to 40 wt. %) of the adhesive layer, based on the total weight of the adhesive layer. The tackifier can be one of many suitable tackifiers such as at least one of a rosin ester resin, an aromatic hydrocarbon resin, an aliphatic hydrocarbon resin, or a terpene resin.

The first and second foam layers can be similar in terms of content and will be discussed concurrently. Although the first and second foam layers are discussed concurrently, one of ordinary skill in the art will appreciate that the parameters discussed herein are applicable to each of the first and second foam layers individually or in combination.

In some embodiments, the first foam layer and the second foam layer can independently range from 10 wt. % to 60 wt. % (in some embodiments, 20 wt. % to 50 wt. %, or even 30 wt. % to 40 wt. %) of the polymeric multilayer material. In some embodiments, the thickness of the first foam layer and the second foam layer can range from 100 micrometers to 750 micrometers (in some embodiments, 200 micrometers to 600 micrometers, 300 micrometers to 500 micrometers, or even 350 micrometers to 450 micrometers).

In some embodiments, the first foam layer and the second foam layer can each include a polymer component and an expandable microsphere component dispersed within the polymer component. Each component may be present in the respective foam layer in the same or different amounts, which can lead to different properties (e.g., modulus or strength) in each layer.

The polymer component is the major component in the first and second foam layers. In some embodiments, the polymer component can range from 70 wt. % to 96 wt. % (in some embodiments, 75 wt. % to 95 wt. %, or even 80 wt. % to 90 wt. %) of the first foam layer, based on the total weight of the first foam layer.

The polymer component of the first or second layer can be one or more of many types of suitable polymers. For example, suitable polymers include at least one of a polyethylene, a polyethylene copolymer a polypropylene, a polyurethane, a polylactic acid an ethylene and methacrylate ester copolymer, polyvinyl chloride, polycarbonate, polystyrene, polyester, polylactide, polyvinylidene fluoride, ethylene vinyl acetate copolymer, acrylate-modified ethylene vinyl acetate polymer, ethylene acrylic acid copolymers, nylon, or copolymers thereof. An exemplary polymer is an ethylene and methacrylate ester copolymer available under the trade designation "ELVALOY 1609" from Dupont, Wilmington, Del. Suitable examples of polyethylene include metallocene polyethylene copolymers, ethylene vinyl acetate copolymer, ethylene/acrylic acid copolymers. Where the polymer is a polyethylene, the polyethylene can be characterized by its density. In some embodiments, the polyethylene can be a very low-density polyethylene (VLDPE) such as a polymer available under the trade designation "INFUSE 9507" from Dow Chemical Company; a low-density polyethylene (LDPE) such as a polymer available under the trade designation "PETROTHENE NA217000" from LyondellBasell, Rotterdam Netherlands; or a high-density polyethylene (HDPE) such as a polymer available under the trade designation "DOW ELITE 5960G" from Dow Chemical Company. In some embodiments, the density of the VLDPE, is in a range from 0.80 $g/cm^3$ to 0.86 $g/cm^3$ (in some embodiments, 0.81 $g/cm^3$ to 0.85 $g/cm^3$, or even 0.82 $g/cm^3$ to 0.84 $g/cm^3$). In some embodiments, the density of the LDPE is in a range from 0.90 $g/cm^3$ to 0.92 $g/cm^3$ (in some embodiments, 0.90 $g/cm^3$ to 0.91 $g/cm^3$). In some embodiments, the density of the HDPE is in a range, for example, from 0.92 $g/cm^3$ to 0.96 $g/cm^3$ (in some embodiments, 0.93 $g/cm^3$ to 0.95 $g/cm^3$).

In some embodiments, the first and second foam layers can include a respective first plurality and second plurality of expandable microspheres. Expandable microspheres are generally characterized as microscopic spheres that encapsulate a low-boiling (e.g., volatile) material such as a hydrocarbon. The expandable microspheres can have any suitable average diameter. For example, the diameter of the microsphere can range from 5 micrometers to 40 micrometers (in some embodiments, 10 micrometers to 35 micrometers, 15 micrometers to 30 micrometers, or even 20 micrometers to 25 micrometers). The expandable microspheres can expand in volume when heated. In some embodiments, the increase in the volume of the microspheres can range from 10 times to 80 times their original volume (in some embodiments, 20 times to 70 times, 30 times to 60 times, or even 40 times to 50 times). When expanded, the microspheres provide the first or second foam layers with a modulus of elasticity and resiliency that can be desirable for many different applications. The properties conferred in part by the expandable microspheres can be tied to the amount of the microspheres in each foam layer.

The expandable microspheres can form any suitable proportion of the first and second foam layers, respectively. For example, the first and second pluralities of microspheres can range from 4 wt. % to 25 wt. % (in some embodiments, 8 wt. % to 15 wt. %, or even 6 wt. % to 9 wt. %) of the first foam layer and second foam layer, respectively. As shown in FIG. 1, first and second pluralities of microspheres 107 and 108 are homogenously distributed in first and second foam layers 105 and 106, respectively. In additional examples, the first and second pluralities of microspheres can be heterogeneously distributed in the respective first and second foam layers. The distribution of the first and second pluralities of microspheres can affect the properties of the first and second foam layers (i.e., the first and second foam layers can have regions that can be more resilient than other regions).

As shown in FIG. 1 the interface between first foam layer 105 and adhesive layer 101 as well as the interface between second foam layer 106 and adhesive layer 101 is a mixed interface (i.e., each interface includes a boundary between the microspheres and the adhesive). That is, at least a portion of the respective first and second plurality of expandable microspheres 107 and 108 are at least partially embedded within adhesive layer 101. This may help to improve the adhesion of the first and second foam layers to the adhesive layer. In some embodiments, the respective portion of the first and second pluralities of microspheres can form any suitable proportion of the overall weight of the polymeric multilayer material. For example, the portion of the first and second portion of expandable microspheres at least partially embedded within the adhesive layer can range from about 5 wt. % to 50 wt. % (in some embodiments 10 wt. % to 45 wt. %, 15 wt. % to 40 wt. %, 20 wt. % to 35 wt. %, or even 25 wt. % to 30 wt. %) of the expandable microspheres of the first foam layer and second foam layer, based on the total weight of expandable microspheres in the polymeric multilayer material.

Although the first and second foam layers 105, 205 and 106, 206 are shown in FIGS. 1 and 2 as individual foam layers, each foam layer can include a plurality of foam layers. Each of the foam layers can have a substantially similar composition (e.g., materials and their respective weight percentages) as the first foam layer and second foam layer. The pluralities of foam layers can form a monolithic foam layer, which may be formed by coextruding a plurality of foam layers. For example, each foam layer can be formed from 2 layers to 20 layers (in some embodiments, 5 layers to 15 layers).

The first and second skin layers are similar in terms of content and will be discussed concurrently. Although the first and second skin layers are discussed concurrently, one of ordinary skill in the art will appreciate that the parameters discussed herein are applicable to each of first and second skin layers independently or in combination.

According to various embodiments the first skin layer and the second skin layer can independently range from 2 wt. % to 40 wt. % (in some embodiments, 5 wt. % to 30 wt. %, or even 7 wt. % to 20 wt. %) of the polymeric multilayer material. An individual thickness of the first skin layer and the second skin layer can range from 5 micrometers to 250 micrometers (in some embodiments, 10 micrometers to 125 micrometers, 15 micrometers to 100 micrometers, or even 25 micrometers to 50 micrometers).

The first skin layer and the second skin layer can be each formed from any suitable components. For example, the first skin layer and the second skin layer can each include a polymer component that includes at least one polymer. Each component may be present in the respective skin layer in different amounts, which leads to different properties (e.g., strength) in each skin layer.

The polymer component is the major component in the first and second skin layers. For example, at least one polymer can independently range from 70 wt. % to 100 wt. % (in some embodiments, 75 wt. % to 95 wt. %, or even 80 wt. % to 90 wt. %) of the first or second skin layer, based on the total weight of the first or second skin layer.

The polymer of the first or second layer can be one or more of many types of suitable polymers. For example, suitable polymers include a polyethylene, a polypropylene, a polyurethane, a polylactic acid, an ethylene and methacrylate ester copolymer, or copolymers thereof such as those described above with reference to the first and second foam layers.

Although the first and second skin layers can include components selected from many suitable polymers and other components, the skin layers are substantially free of expandable microspheres (i.e., the first and second skin layers include only up to 4 wt. % (i.e., 0 wt. % to 4 wt. %) expandable microspheres compared to the total weight percent of the polymeric multilayer material).

The first and second skin layers define the external surface of the polymeric multilayer material. In some embodiments, the first and second skin layers are stiffer or have a lower modulus than the first and second foam layers. This may increase the toughness of the polymeric multilayer material. Further, the first and second skin layers may be useful in a post processing step. Post-processing steps can include laminating to the first or second skin layers a protective layer, a pressure sensitive adhesive layer, or a nonwoven backing.

The physical properties of the polymeric multilayer material can be a function of the material used in each of the adhesive layer, first and second foam layers, and first and second skin layers. In some embodiments, the density of the polymeric multilayer material is in a range from 0.20 g/cm$^3$ to 0.50 g/cm$^3$ (in some embodiments, 0.25 g/cm$^3$ to 0.45 g/cm$^3$, or even 0.30 g/cm$^3$ to 0.40 g/cm$^3$). The density of the polymeric multilayer material can be a function of the polymer used in each layer (e.g., HDPE or LDPE) or the extent to which the expandable microspheres are present in the first and second foam layers. Less dense polymeric multilayer materials may be more resilient but denser polymeric multilayer materials may be stronger. The variability in the density can, in part, be used to tailor the characteristics of the polymeric multilayer material. Further, the thickness of the polymeric multilayer material can be varied for particular applications. In some embodiments, the thickness of the polymeric multilayer material is in a range from 250 micrometers to 1550 micrometers (in some embodiments, 350 micrometers to 1450 micrometers, 450 micrometers to 1350 micrometers, 550 micrometers to 1250 micrometers, 650 micrometers to 1150 micrometers, 750 micrometers to 1050 micrometers, or even 850 micrometers to 950 micrometers). The total thickness of the polymeric multilayer material can result in a stronger material if the density of the polymeric multilayer material is also dense, or can result in a more resilient material if the material is less dense and includes a higher weight percentage of expandable microspheres.

Across all ranges of density or thickness, the polymeric multilayer material can exhibit good strength. In some embodiments, the amount of force required to tear the polymeric multilayer material along a length of the material as determined by the "Tensile Test" described in the Examples. In some examples, the amount of force to tear the sample in a downweb direction is in a range from 88 Newtons to 147 Newtons (in some embodiments, 100 Newtons to 130 Newtons, or even 115 Newtons to 125 Newtons). In some examples, the amount of force to tear the sample in a crossweb direction is in a range from 70 Newtons to 110 Newtons applied in (in some embodiments, 80 Newtons to 100 Newtons, or even 90 Newtons to 95 Newtons).

Figure 3A:
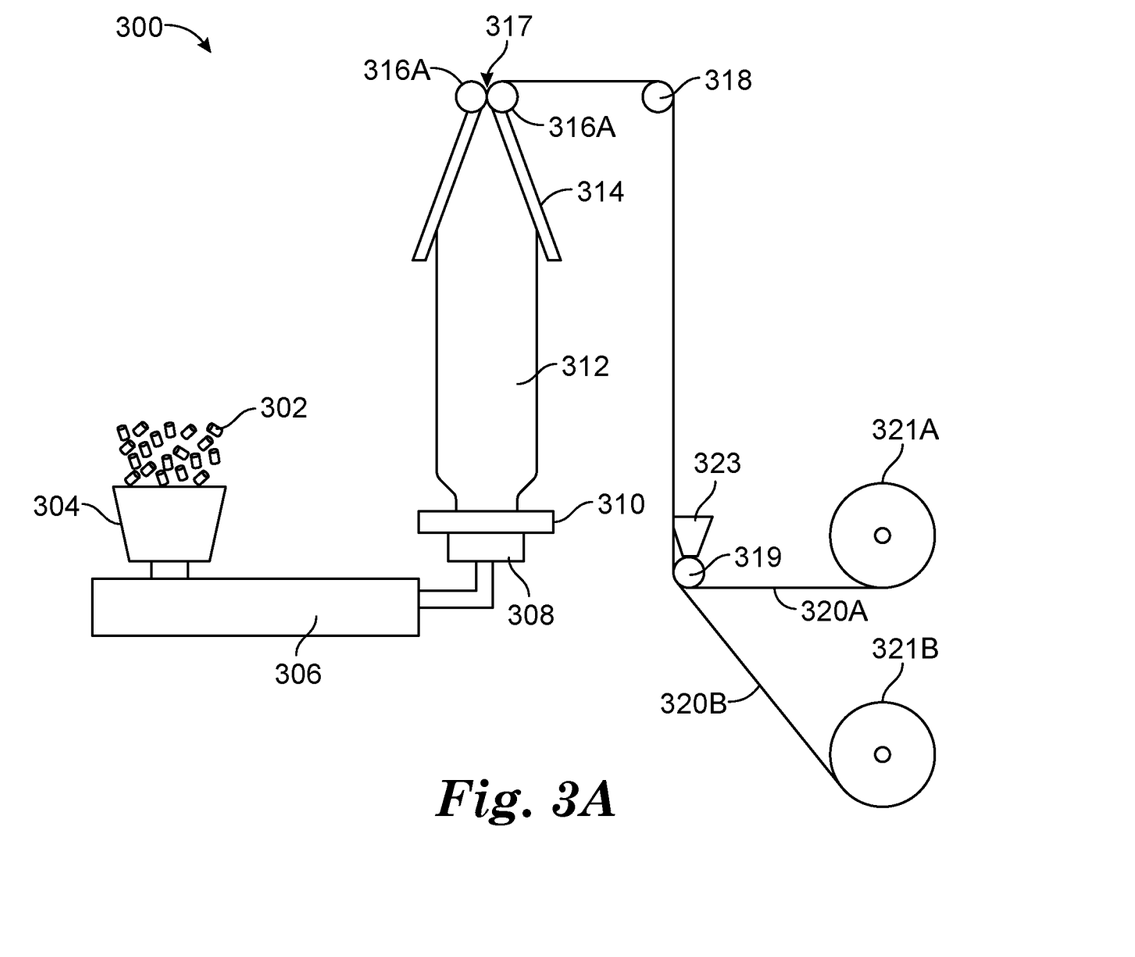
FIGS. 3A and 3B are schematic and sectional view of an apparatus used for blown-film extrusion.
Figure 3B:
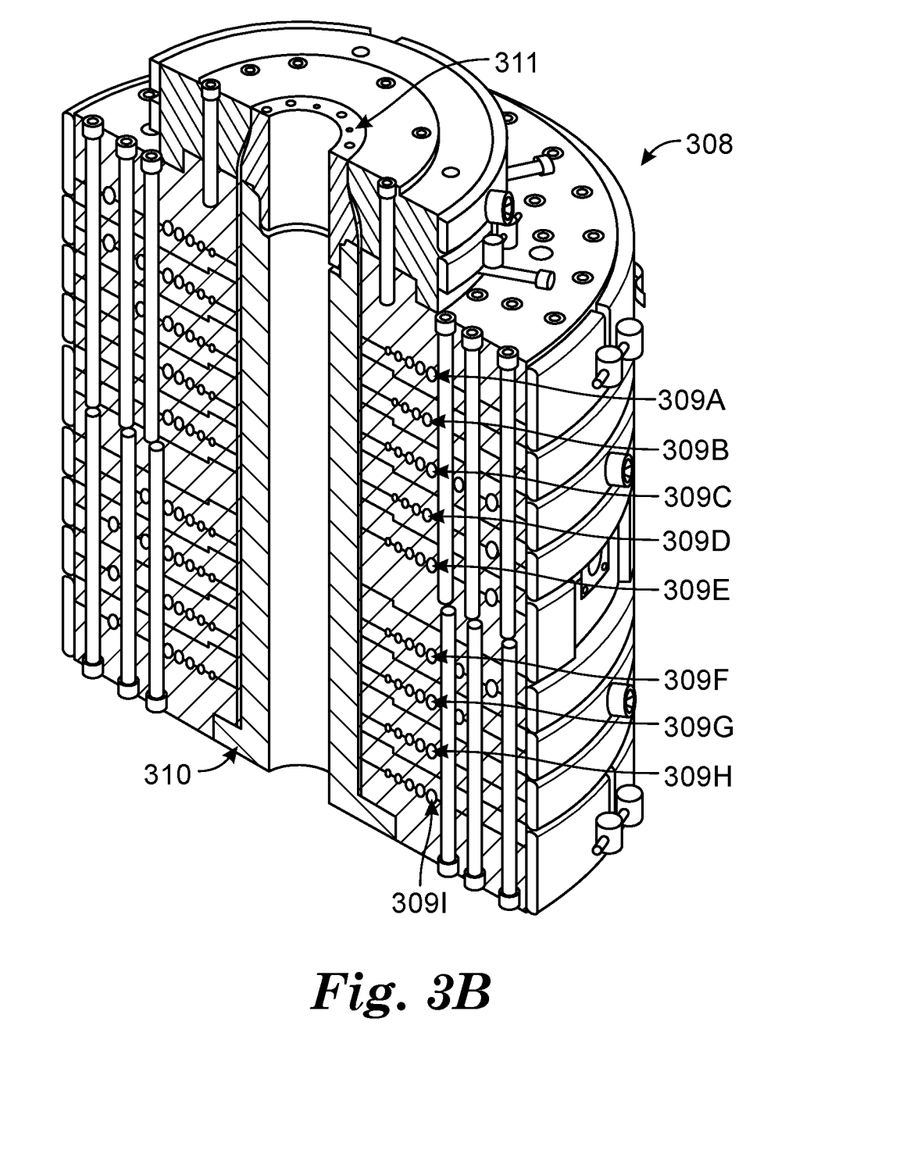

The polymeric multilayer material described herein can be formed, for example, by a coextrusion and blown film process. The process can use an annular die to a form a molten tube of film oriented radially via air pressure in a "bubble" that is pulled lengthwise in the molten area to bring the film to a final desired thickness. FIG. 3A, shows apparatus 300 for making the polymeric multilayer film. Apparatus 300 includes hopper 304, extruder 306, annular die 308, air ring 310, collapsing frame 314, rollers 316A, 316B that form nip 317, slitting station 323, and idler rolls 318, 319. FIG. 3B, is a sectional view of nine-layer annular die 308 which includes, stacked die plates with each individual die plate stack layer having machined polymer flow channels 309A, 309B, 309C, 309D, 309E, 309F, 309G, 309H, 309I. During the blow film process the molten polymer passes through the flow channels 309A, 309B, 309C, 309D, 309E, 309F, 309G, 309H, 309I and contacts central die cylinder 310 and then flows upward combining with other layers and exits annular die opening 311 to form film bubble 312. The number of layers in the polymeric multilayer film can be adjusted by the number of stacking die plates in the annular die.

In operation, resin 302 and any suitable additives are added to hopper 304. A coextruded precursor exits extruder 306 and enters annular die 308. Air ring 310 provides uniform air flow over the molten polymer bubble which stabilizes and aids in cooling of the polymer bubble forming the circular film bubble 312 into a collapsed film tube by passing through nip 311 formed by contacting nip rolls 316A and 316B. The collapsed film tube traverses idler rolls 318 and passes through slitting station 323 resulting in the formation of two flat films 320A and 320B that are pass over additional idler roll 319. Films 320A and 320B are then wound into individual rolls 321A and 321B, respectively The coextruded precursor polymeric multilayer material can be formed from a first extrudable feedstock, a second extrudable feedstock, and a third extrudable feedstock. The first extrudable feedstock includes the adhesive, the second extrudable feedstock includes a polymer as well as the expandable microspheres, and the third extrudable feedstock includes a polymer and is substantially free of (i.e., only up to 4 wt. % (i.e., 0 wt. % to 4 wt. %)) the microspheres of the second extrudable feedstock.

Figure 4:
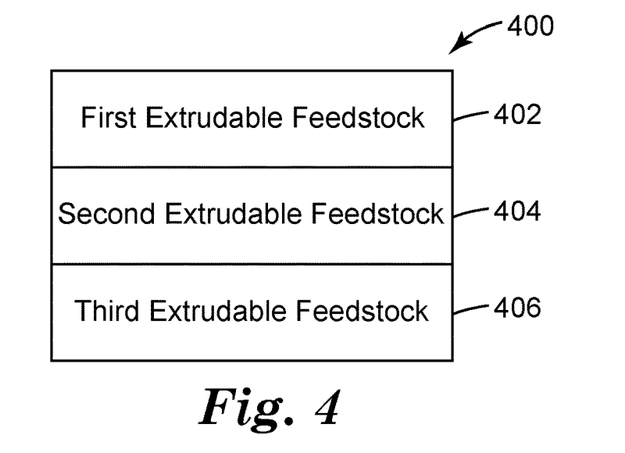
FIG. 4 is schematic view of an exemplary coextruded precursor that can provide an exemplary polymeric multilayer material described herein.

An example of coextruded precursor 400 is shown in FIG. 4. As shown in FIG. 4, coextruded precursor 400 includes first extrudable feedstock layer 402, second extrudable feedstock layer 404, and third extrudable feedstock layer 406. The extrusion can be run at any suitable temperature. In some embodiments, the extrusion can be run at a temperature ranging from 175° C. to 220° C. (in some embodiments, 180° C. to 210° C., 185° C. to 200° C., or even 190° C. to 210° C.). Further, foam layers or skin layers can be formed by coextruding those layers from additional feedstocks (e.g., a, fourth, fifth, sixth, or seventh feedstock).

After the coextruded precursor is formed, a film bubble is formed from the coextruded precursor as described above. The bubble has an internal surface formed from the first extrudable feedstock and an external surface formed from the third extrudable feedstock.

Once the blown film bubble is collapsed, the adhesive on one side of the inner surface comes into contact with the adhesive on another side of the inner surface. The sides of the adhesive layers are smooth in that these are not the sides that the expandable microspheres are embedded in. The smooth surfaces can help to increase the quality of the bond between the inner surfaces formed during lamination. The increased quality of the bond can strengthen the resulting material as a whole. Pressure is applied and the two adhesives bond together thus forming adhesive layer 101 (see FIG. 1), first foam layer 105 and second foam layer 106, as well as first skin layer 109 and second skin layer 110.

Figure 5A:
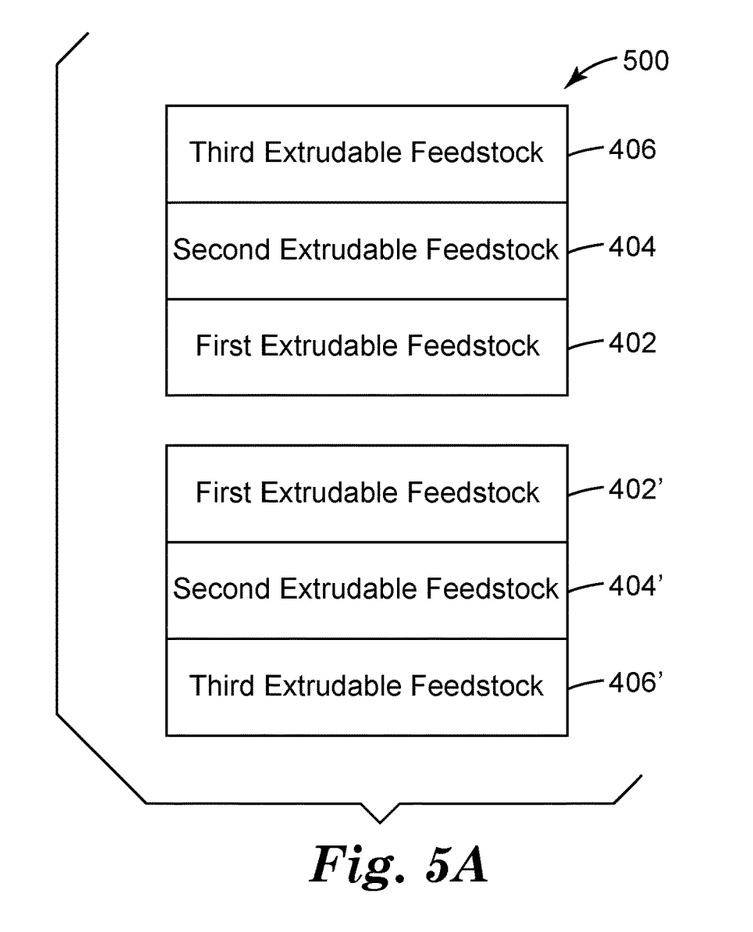
FIGS. 5A and 5B are schematic views of portions of an exemplary blown-film bubble.
Figure 5B:
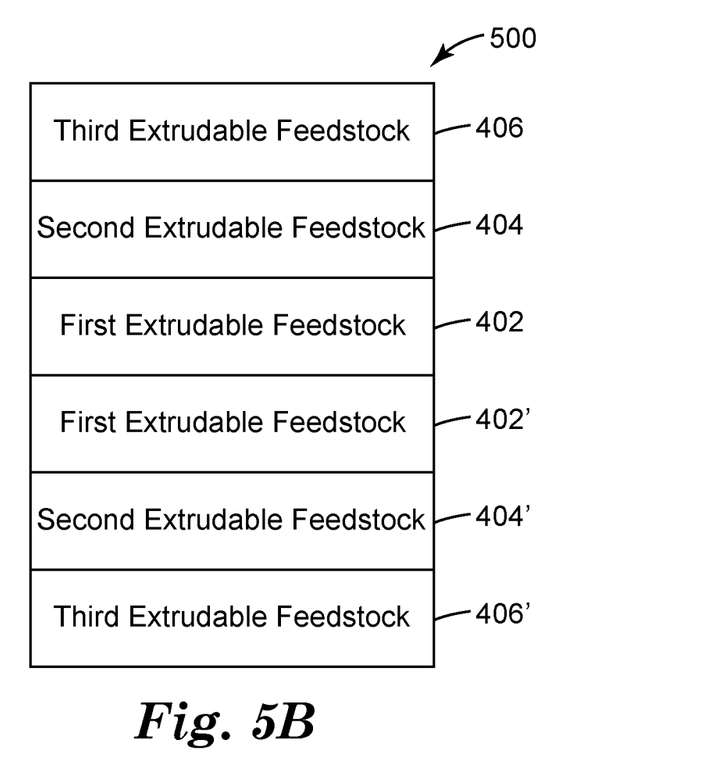

FIG. 5A is a schematic view of opposed sides of bubble 500 before it is collapsed and FIG. 5B is a schematic view of bubble 500 after it is collapsed. Prime symbols represent the extrudable feedstock layers form opposed sides of bubble 500. After the opposed sides are pressed, adhesive layer 101 is formed by the adhesive on opposed first extrudable feedstocks 402 and 402', first foam layer 105 and first skin layer 109 are formed from second and third extrudable feedstocks 404 and 406, which are attached to one first extrudable feedstock; and second foam layer 106 and second skin layer 110 are formed from second and third extrudable feedstocks 404' and 406', which are attached to first extrudable feedstock 402'.

Embodiments, of polymeric multilayer materials described herein are useful, for example, as wearable medical or athletic support components. The materials can also be used as protective wrappings. For example, the materials can be wrapped around a sharp corner of an article, building, etc.

EXEMPLARY EMBODIMENTS

The following exemplary embodiments are provided, the numbering of which is not to be construed as designating levels of importance:

1A. A polymeric multilayer material comprising:
an adhesive layer having a first and second opposed major surfaces;
a first foam layer having a first plurality of expandable microspheres dispersed therein and joined to the first major surface of the internal adhesive layer;
a first skin layer that is free of (i.e., only up to 4 wt. % (i.e., 0 wt. % to 4 wt. %)) the first plurality expandable microspheres (i.e., contains less than 4 wt. % of the first expandable microspheres, based on the total weight of the first skin layer) in the first foam layer and that is attached to the first foam layer to define a first external surface of the polymeric multilayer material;
a second foam layer having a second plurality of expandable microspheres dispersed therein and joined to the second major surface of the internal adhesive layer; and
a second skin layer that is free of (i.e., only up to 4 wt. % (i.e., 0 wt. % to 4 wt. %)) the second plurality of expandable microspheres in the second foam layer and that is attached to the second foam layer to define a second external surface of the polymeric multilayer material,
wherein a portion of the first expandable microspheres of the first foam layer is at least partially embedded within the adhesive layer and a portion of the second expandable microspheres of the second foam layer is at least partially embedded within the adhesive layer.

2A. The polymeric multilayer material of Exemplary Embodiment 1A, wherein the adhesive layer is in a range from 2% to 20% of the total polymeric multilayer material thickness (in some embodiments, 5% to 15% of the total polymeric multilayer material thickness or even 6% to 8% of the total polymeric multilayer material thickness).

3A. The polymeric multilayer material of any preceding A Exemplary Embodiment, wherein the adhesive layer has a thickness in a range from 5 micrometers to 250 micrometers (in some embodiments, 10 micrometers to 150 micrometers, 15 micrometers to 100 micrometers, or even 20 micrometers t40 micrometers).

4A. The polymeric multilayer material of any preceding A Exemplary Embodiment, wherein the adhesive layer comprises an adhesive in a range from 50 wt. % to 100 wt. % 50 wt. % to 100 wt. % (in some embodiments, 60 wt. % to 90 wt. %, or even 70 wt. % to 80 wt. %) of the adhesive layer, based on the total weight of the adhesive layer.

5A. The polymeric multilayer material of Exemplary Embodiment 4A, wherein the adhesive is a pressure sensitive adhesive.

6A. The polymeric multilayer material of any preceding A Exemplary Embodiment, wherein the adhesive comprises at least one of a natural rubber-based adhesive, a synthetic rubber-based adhesive, a styrene block copolymer-based adhesive, a polyvinyl ether-based adhesive, a poly(methyl acrylate)-based adhesive, a polyolefin-based adhesive, or a silicone-based adhesive (where "-based" means contains at least 50% weight, based on the total weight of the adhesive).

7A. The polymeric multilayer material of Exemplary Embodiment 6A, wherein the adhesive layer comprises a tackifier.

8A. The polymeric multilayer material of Exemplary Embodiment 7A, wherein the tackifier is present in a range from 10 wt. % to 60 wt. % (in some embodiments, 20 wt. % to 50 wt. %, or even 30 wt. % to 40 wt. %) of the adhesive layer, based on the total weight of the adhesive layer.

9A. The polymeric multilayer material of either Exemplary Embodiment 7A or 8A, wherein the tackifier is at least one of a rosin ester resin, an aromatic hydrocarbon resin, an aliphatic hydrocarbon resin, or a terpene resin.

10A. The polymeric multilayer material of any preceding A Exemplary Embodiment, wherein at least one of:
the first foam layer is in a range from 10 wt. % to 60 wt. % (in some embodiments, 20 wt. % to 50 wt. %, or even 30 wt. % to 40 wt. %) of the polymeric multilayer material; or
the second foam layer is in a range from 10 wt. % to 60 wt. % (in some embodiments, 20 wt. % to 50 wt. %, or even 30 wt. % to 40 wt. %) of the polymeric multilayer material, based on the total weight of the polymeric multilayer material.

11A. The polymeric multilayer material of any preceding A Exemplary Embodiment, wherein at least one of:
the first foam layer and the second foam layer has a thickness in a range from 100 micrometers to 750 micrometers (in some embodiments, 200 micrometers to 600 micrometers, 300 micrometers to 500 micrometers, or even 350 micrometers to 450 micrometers); or
the second foam layer and the second foam layer has a thickness in a range from 100 micrometers to 750 micrometers (in some embodiments, 200 micrometers to 600 micrometers, 300 micrometers to 500 micrometers, or even 350 micrometers to 450 micrometers).

12A. The polymeric multilayer material of any preceding A Exemplary Embodiment, wherein at least one of the first foam layer or the second foam layer comprises a polymer wherein the polymer is least one of a polyethylene, a polyurethane, a polylactic acid, a polypropylene, an ethylene and methacrylate ester copolymer, or copolymers thereof.

13A. The polymeric multilayer material of Exemplary Embodiment 12A, wherein the at least one of:
the polymer is in a range from 70 wt. % to 96 wt. % (in some embodiments, 75 wt. % to 95 wt. %, or even 80 wt. % to 90 wt. %) of the first foam layer; or
the polymer is in a range from 70 wt. % to 96 wt. % (in some embodiments, 75 wt. % to 95 wt. %, or even 80 wt. % to 90 wt. %) of the second foam layer, based on the total weight of the respective first and second foam layers.

14A. The polymeric multilayer material of Exemplary Embodiment 12A, wherein the at least one of:
the polymer is in a range from 90 wt. % to 96 wt. % of the first foam layer; or the polymer is in a range from 90 wt. % to 96 wt. % of the second foam layer, based on the total weight of the respective first and second foam layers.

15A. The polymeric multilayer material of any of Exemplary Embodiments 1A to 14A, wherein the polymer of at least one of the first foam layer or the second foam layer is a polyethylene having a density of in a range from 0.80 g/cm$^3$ to 0.86 g/cm$^3$ (in some embodiments, 0.81 g/cm$^3$ to 0.85 g/cm$^3$, or even from 0.82 g/cm$^3$ to 0.84 g/cm$^3$).

16A. The polymeric multilayer material of any of Exemplary Embodiments 1A to 14A, wherein the polymer of at least one of the first foam layer or the second foam layer is a polyethylene having a density in a range from 0.90 g/cm$^3$ to 0.92 g/cm$^3$ (in some embodiments, 0.90 g/cm$^3$ to 0.91 g/cm$^3$).

17A. The polymeric multilayer material of any of Exemplary Embodiments 1A to 14A, wherein the polymer of at least one of the first foam layer or the second foam layer is a polyethylene having a density in a range from 0.92 g/cm$^3$ to 0.96 g/cm$^3$ (in some embodiments, 0.93 g/cm$^3$ to 0.95 g/cm$^3$).

18A. The polymeric multilayer material of any preceding A Exemplary Embodiment, wherein at least one of:
the first plurality of expandable microspheres of the first foam layer is in a range from 4 wt. % to 25 wt. % (in some embodiments, 8 wt. % to 15 wt. %, or even 6 wt. % to 9 wt. %); or
the second plurality of expandable microspheres of the second foam layer is in a range from 4 wt. % to 25 wt. % (in some embodiments, 8 wt. % to 15 wt. %, or even 6 wt. % to 9 wt. %) of the second foam layer, based on the total weight of the respective first and second pluralities of expandable microspheres.

19A. The polymeric multilayer material of any preceding A Exemplary Embodiment, wherein at least one of:
the first plurality of expandable microspheres of the first foam layer is in a range from 4 wt. % to 8 wt. % of the first foam layer; or
the second plurality of expandable microspheres of the second foam layer is in a range from 4 wt. % to 8 wt. % of the second foam layer, based on the total weight of the respective first and second pluralities of expandable microspheres.

20A. The polymeric multilayer material of any preceding A Exemplary Embodiment, wherein at least one of:
the first plurality of expandable microspheres in the first foam layer is homogenously distributed throughout the first foam layer; or
the second plurality of expandable microspheres in the second foam layer is homogenously distributed throughout the second foam layer.

21A. The polymeric multilayer material of any of Exemplary Embodiments 1A to 19A, wherein at least one of:
the first plurality of expandable microspheres in the first foam layer is heterogeneously distributed throughout the first foam layer; or
the second plurality of expandable microspheres in the second foam layer is heterogeneously distributed throughout the second foam layer.

22A. The polymeric multilayer material of any preceding A Exemplary Embodiment, wherein at least one of:
the portion of the first plurality of expandable microspheres in the first foam layer that is at least partially embedded within the adhesive layer is in a range from 5 wt. % to 50 wt. % of the expandable microspheres of the first foam layer; or
the portion of the second plurality of expandable microspheres in the second foam layer that is at least partially embedded within the adhesive layer is in a range from 5 wt. % to 50 wt. % (or in some embodiments, 10 wt. % to 45 wt. %, 15 wt. % to 40 wt. %, 20 wt. % to 35 wt. %, or even 25 wt. % to 30 wt. %) of the expandable microspheres of the second foam layer, based on the total weight of the respective first and second pluralities of expandable microspheres.

23A. The polymeric multilayer material of any of Exemplary Embodiments 1A to 21A, wherein at least one of:
the portion of the first plurality of expandable microspheres in the first foam layer that is at least partially embedded within the adhesive layer is in a range from 5 wt. % to 20 wt. % of the expandable microspheres of the first foam layer; or
the portion of the second plurality of expandable microspheres in the second foam layer that is at least partially embedded within the adhesive layer is in a range from 5 wt. % to 20 wt. % of the expandable microspheres of the second foam layer, based on the total weight of the respective first and second pluralities of expandable microspheres.

24A. The polymeric multilayer material of any preceding A Exemplary Embodiment, wherein at least one of the first foam layer or the second foam layer is a monolithic layer formed from a plurality of coextruded foam layers having substantially the same composition as at least one of the first foam layer or the second foam layer.

25A. The polymeric multilayer material of any of Exemplary Embodiments 1A to 23A, wherein at least one of the first foam layer or the second foam layer is a monolithic layer having in a range from 2 to 20 coextruded foam layers.

26A. The polymeric multilayer material of any preceding A Exemplary Embodiment, wherein at least one of:
the first skin layer is in a range from 2 wt. % to 40 wt. % (in some embodiments, 5 wt. % to 30 wt. %, or even 7 wt. % to 20 wt. %) of the polymeric multilayer material; or
the second skin layer is in a range from 2 wt. % to 40 wt. % (in some embodiments, 5 wt. % to 30 wt. %, or even 7 wt. % to 20 wt. %) of the polymeric multilayer material,
based on the total weight of the polymeric multilayer material.

27A. The polymeric multilayer material of any of Exemplary Embodiments 1A to 25A, wherein at least one of:
the first skin layer is 20 wt. % to 30 wt. % of the polymeric multilayer material; or
the second skin layer is 20 wt. % to 30 wt. % of the polymeric multilayer material, based on the total weight of the polymeric multilayer material.

28A. The polymeric multilayer material of any preceding A Exemplary Embodiment, wherein at least one of:
the first skin layer has a thickness ranging from 5 micrometers to 250 micrometers (in some embodiments, 10 micrometers to 125 micrometers, 15 micrometers to 100 micrometers, or even 25 micrometers to 50 micrometers), or
the second skin layer has a thickness ranging from 5 micrometers to 250 micrometers (in some embodiments, 10 micrometers to 125 micrometers, 15 micrometers to 100 micrometers, or even 25 micrometers to 50 micrometers).

29A. The polymeric multilayer material of any preceding A Exemplary Embodiment, wherein at least one of the first skin layer or the second skin layer comprises a polymer, wherein the polymer is at least one of a polyethylene, a polypropylene, a polyurethane, a polylactic acid, ethylene and methacrylate ester copolymer, or copolymers thereof.

30A. The polymeric multilayer material of Exemplary Embodiment 29A, wherein the at least one of:
the polymer is 70 wt. % to 100 wt. % (in some embodiments, 75 wt. % to 95 wt. % or even 80 wt. % to 90 wt. %) of the first skin layer, and
the polymer is 70 wt. % to 100 wt. % (in some embodiments, 75 wt. % to 95 wt. % or even 80 wt. % to 90 wt. %) of the second skin layer,
based on the total weight of the respective first and second skin layers.

31A. The polymeric multilayer material of Exemplary Embodiment 29A, wherein the at least one of:
the polymer is 90 wt. % to 100 wt. % of the first skin layer, or
the polymer is 90 wt. % to 100 wt. % of the second skin layer,
based on the total weight of the respective first and second skin layers.

32A. The polymeric multilayer material of any of Exemplary Embodiments 29A to 31A, wherein the polymer of at least one of the first skin layer and the second skin layer is a polyethylene having a density in a range from 0.80 g/cm$^3$ to 0.86 g/cm$^3$ (in some embodiments, 0.81 g/cm$^3$ to 0.85 g/cm$^3$, or even 0.82 g/cm$^3$ to 0.84 g/cm$^3$).

33A. The polymeric multilayer material of any of Exemplary Embodiments 29A to 31A, wherein the polymer of at least one of the first skin layer and the second skin layer is a polyethylene having a density in a range from 0.90 g/cm$^3$ to 0.92 g/cm$^3$ (in some embodiments, 0.90 g/cm$^3$ to 0.91 g/cm$^3$).

34A. The polymeric multilayer material of any of Exemplary Embodiments 29A to 31A, wherein the polymer of at least one of the first skin layer and the second skin layer is polyethylene having a density in a range from 0.92 g/cm$^3$ to 0.96 g/cm$^3$ (in some embodiments, 0.93 g/cm$^3$ to 0.95 g/cm$^3$).

35A. The polymeric multilayer material of any preceding A Exemplary Embodiment, wherein:
the adhesive layer is 20 wt. % to 40 wt. % of the polymeric multilayer material, has a thickness ranging from 1270 micrometers to 4500 micrometers, and is a pressure sensitive adhesive;
the first foam layer is 20 wt. % to 40 wt. % of the polymeric multilayer material, has a thickness ranging from 1270 micrometers to 4500 micrometers, is an ethylene methacrylate ester copolymer, and the expandable microspheres are 4 wt. % to 8 wt. % of the first foam layer;

the second foam layer is 20 wt. % to 40 wt. % of the polymeric multilayer material, has a thickness in a range 1270 micrometers to 4500 micrometers, is an ethylene methacrylate ester copolymer, and the expandable microspheres are in a range from 4 wt. % to 8 wt. % of the second foam layer;

the first skin layer is in a range from 20 wt. % to 40 wt. % of the polymeric multilayer material, has a thickness in a range from 1270 micrometers to 4500 micrometers, and is a high-density polyethylene; and the second skin layer is 20 wt. % to 40 wt. % of the polymeric multilayer material, has a thickness in a range from 1270 micrometers to 4500 micrometers, and is a high-density polyethylene.

36A. The polymeric multilayer material of any preceding A Exemplary Embodiment, wherein a density of the polymeric multilayer material in a range from 0.20 g/cm$^3$ to 0.50 g/cm$^3$ (in some embodiments, 0.25 g/cm$^3$ to 0.35 g/cm$^3$).

37A. The polymeric multilayer material of any preceding A Exemplary Embodiment, wherein a thickness of the polymeric multilayer material in a range from 250 micrometers to 1550 micrometers (in some embodiments, 350 micrometers to 1450 micrometers, 450 micrometers to 1350 micrometers, 550 micrometers to 1250 micrometers, 650 micrometers to 1150 micrometers, 750 micrometers to 1050 micrometers, or even 850 micrometers to 950 micrometers).

38A. The polymeric multilayer material of any preceding A Exemplary Embodiment, wherein an amount of force required to tear the polymeric multilayer material in a downweb direction is in a range from 88 Newtons to 147 Newtons (in some embodiments, 100 Newtons to 130 Newtons, or even 115 Newtons to 125 Newtons).

39A. The polymeric multilayer material of any preceding A Exemplary Embodiment, wherein an amount of force required to tear the polymeric multilayer material in a crossweb direction is in a range from 70 Newtons to 110 Newtons applied in (in some embodiments, 80 Newtons to 100 Newtons, or even 90 Newtons to 95 Newtons).

1B. A method of forming a polymeric multilayer material of any preceding A Exemplary Embodiment, the method comprising:
  coextruding a plurality of layers, to form a coextruded precursor polymeric multilayer material, the plurality of layers comprising:
    a first extrudable feedstock comprising an adhesive;
    a second extrudable feedstock comprising a first polymer component, wherein 4 wt. % to 25 wt. % of the first polymer component is expandable microspheres, based on the total weight of the second extrudable feedstock; and
    a third extrudable feedstock comprising a second polymer component, wherein the second polymer component is free of (i.e., only up to 4 wt. % (i.e., 0 wt. % to 4 wt. %)) the microspheres of the first extrudable feedstock;
  forming an annular blown film from the coextruded precursor polymeric multilayer material; and
  collapsing the annular blown film to form the polymeric multilayer material.

2B. The method of Exemplary Embodiment 1B, wherein forming an annular blown film comprises passing the coextruded precursor polymeric multilayer material through an annular die.

3B. The method of any preceding B Exemplary Embodiment, wherein the plurality of layers is coextruded at a temperature ranging from 175° C. to 220° C. (in some embodiments, 180° C. to 210° C., 185° C. to 200° C., or even 190° C. to 210° C.).

4B. The method of any preceding B Exemplary Embodiment, wherein the adhesive defines an inner surface of the blown film and collapsing the annular blown film brings the adhesive on one side of the inner surface into contact with the adhesive on another side of the inner surface.

5B. The method of any preceding B Exemplary Embodiment, further comprising pressing the collapsed annular blown film.

6B. The method of any preceding B Exemplary Embodiment, wherein at least one of:
  the plurality of layers comprises a fourth extrudable feedstock comprising a polymer component, wherein 4 wt. % to 25 wt. % of the polymer component is microspheres, based on the total weight of the fourth extrudable feedstock;
  the plurality of layers comprises a fifth extrudable feedstock comprising a polymer component, wherein 4 wt. % to 25 wt. % of the polymer component is microspheres, based on the total weight of the fifth extrudable feedstock;
  the plurality of layers comprises a sixth extrudable feedstock comprising a polymer component, wherein 4 wt. % to 25 wt. % of the polymer component is microspheres, based on the total weight of the sixth extrudable feedstock; or
  the plurality of layers comprises a seventh extrudable feedstock comprising a polymer component, wherein 4 wt. % to 25 wt. % of the polymer component is microspheres, based on the total weight of the seventh extrudable feedstock, and
  wherein the first extrudable feedstock is attached to the third extrudable feedstock and the second extrudable feedstock define a respective inner surface and outer surface of the coextruded film.

7B. The method of Exemplary Embodiment 6B, wherein coextruding the plurality of layers comprises coextruding the second, fourth, fifth, sixth, and seventh extrudable feedstocks to form a monolithic layer.

8B. The method of any preceding B Exemplary Embodiment, wherein the polymer component comprises at least one of a polyethylene, a polyurethane, a polylactic acid, a polypropylene, an ethylene and methacrylate ester copolymer, or copolymers thereof.

9B. The polymeric of any of Exemplary Embodiments 1B to 8B, wherein the polymer is a polyethylene having a density is in a range from 0.80 g/cm$^3$ to 0.86 g/cm$^3$ (in some embodiments, 0.81 g/cm$^3$ to 0.85 g/cm$^3$ or even 0.82 g/cm$^3$ to 0.84 g/cm$^3$).

10B. The polymeric multilayer material of any of Exemplary Embodiments 1B to 8B, wherein the polymer is a polyethylene having a density in a range from 0.90 g/cm$^3$ to 0.92 g/cm$^3$ (in some embodiments, 0.90 g/cm$^3$ to 0.91 g/cm$^3$).

11B. The polymeric multilayer material of any of Exemplary Embodiments 1B to 8B, wherein the polymer is a polyethylene having a density in a range from 0.92 g/cm$^3$ to 0.96 g/cm$^3$ (in some embodiments, 0.93 g/cm$^3$ to 0.95 g/cm$^3$).

12B. The method of any preceding B Exemplary Embodiment, wherein the second polymer component comprises at least one of a polyethylene, a polyurethane, a polylactic acid, a polypropylene, an ethylene and methacrylate ester copolymer, or copolymers thereof 13B. The polymeric multilayer material of Exemplary Embodiment 12B, wherein the polymer of the second polymer component is a polyethylene having a density in a range from 0.80 g/cm$^3$ to 0.86 g/cm$^3$ (in some embodiments, 0.81 g/cm$^3$ to 0.85 g/cm$^3$ or even 0.82 g/cm$^3$ to 0.84 g/cm$^3$).

14B. The polymeric multilayer material of Exemplary Embodiment 12B, wherein the polymer of the second polymer component is a polyethylene having a density in a range from 0.90 g/cm$^3$ to 0.92 g/cm$^3$ (in some embodiments, 0.90 g/cm$^3$ to 0.91 g/cm$^3$).

15B. The polymeric multilayer material of Exemplary Embodiment 12B, wherein the polymer of the second polymer component is a polyethylene having a density in a range from 0.92 g/cm$^3$ to 0.96 g/cm$^3$ (in some embodiments, 0.93 g/cm$^3$ to 0.95 g/cm$^3$).

16B. The method of any preceding B Exemplary Embodiment, wherein a portion of the expandable microspheres of the second extrudable feedstock are at least partially embedded within the adhesive layer and a portion of the expandable microspheres of the second foam layer are at least partially embedded within the first extrudable feedstock.

17B. The method of any preceding B Exemplary Embodiment, comprising:
  coextruding the plurality of layers at a temperature ranging from 180° C. to 190° C.;
  passing the coextruded precursor polymeric multilayer material through an annular die;
  blowing a stream of air through the annular die; and
  collapsing the annular blown film to form the polymeric multilayer material.

1C. A polymeric multilayer material comprising:
  a pressure sensitive adhesive layer having a first major surface and an opposing second major surface;
  a first foam layer having a first plurality of expandable microspheres dispersed therein and joined to the first major surface of the internal adhesive layer, wherein the expandable microspheres of the first foam layer are in a range from 4 wt. % to 8 wt. % of the first foam layer, based on the total weight of the first foam layer;
  a first skin layer free of (i.e., only up to 4 wt. % (i.e., 0 wt. % to 4 wt. %)) the first plurality of expandable microspheres of the first foam layer and that is attached to the first foam layer to define a first external surface of the polymeric multilayer material;
  a second foam layer having a second plurality of expandable microspheres dispersed therein and joined to the second side of the internal adhesive layer, wherein the second plurality expandable microspheres of the second foam layer are in a range from 4 wt. % to 8 wt. % of the second foam layer, based on the total weight of the second foam layer; and
  a second skin layer that is free of (i.e., only up to 4 wt. % (i.e., 0 wt. % to 4 wt. %)) the second plurality of expandable microspheres in the second foam layer and that is attached to the second foam layer to define a second external surface of the polymeric multilayer material,
  wherein a portion of the first plurality of expandable microspheres of the first foam layer are at least partially embedded within the adhesive layer and a portion of the second plurality of expandable microspheres of the second foam layer are at least partially embedded within the adhesive layer.

2C. The polymeric multilayer material of Exemplary Embodiment 1C, wherein at least one of the first foam layer, second foam layer, first skin layer, and second skin layer comprise a polymer component.

3C. The polymeric multilayer material of either Exemplary Embodiment 1C or 2C, wherein the polymer is independently at least one of a polyethylene, a polyurethane, a polylactic acid, a polypropylene, an ethylene and methacrylate ester copolymer, and copolymers thereof.

EXAMPLES

Various embodiments of the present disclosure can be better understood by reference to the following Examples which are offered by way of illustration. The present disclosure is not limited to the Examples given herein.

Tensile Test

Tensile testing was performed using a tensile tester (obtained under the trade designation "ZWICK" from Zwick USA, Kennesaw, Ga.). For each Example and Comparative Example, test specimens were cut so that testing could be performed in the downweb (or machine) direction and in the crossweb (or transverse) direction. Test specimens were cut to be 1 inch (2.54 cm) in width. The gauge length was 5.0 cm. Depending on the value measured (i.e., downweb or crossweb tensile strength) clamps were attached to downweb ends or crossweb ends of the specimen. Crosshead speed was 20.0 cm/min. For both downweb and crossweb specimens, the maximum force achieved during the test, and the strain at the force maximum, was recorded. For each Example and Comparative Example, in each of the two principal directions, three specimens were tested.

Hardness Test

The Shore Durometer Hardness Test (ASTM D-2240 (2000)) was used to measure hardness. Using testing equipment commercially obtained as "MODEL #8 SHORE A AND MODEL #9 SHORE D" from Pacific Transducer Corp (PTC Instruments), Los Angeles, Calif.

Both Shore A and Shore D hardness were measured. Each Shore tester (SHORE A and SHORE D) was calibrated. To calibrate each tester, a dial on a gauge of each tester was moved to a zero position. From there a probe of each tester was pressed to a surface of a known hardness. The SHORE A tester was considered calibrated if the gauge read 55 and the SHORE D tester considered calibrated if the gauge read 28.

For each specimen, a 1 inch (2.54 cm) square was cut, and the specimen placed on a hard benchtop surface. The specimens were flattened on the surface and a probe of the respective testers was positioned over the specimen. The probe of the instrument was pressed to the specimen, and the equipment provided a readout on the gauge. For each Example and Comparative Example, five test specimens were tested and the readouts were averaged. According to section 9.3 within test method D-2240, durometer readings below 20 or above 90 are not considered reliable. By this criterion, some of the test specimens were "too soft."

Density

A pycnometer was used to measure the density of each foamed specimen. The buoyancy force was measured according to ASTM D3575-14 (2014) ("Suffix W-test method B), using a pycnometer (obtained under the trade designation "DELTA RANGE" (Model AG204) from Mettler-Toledo, LLC, Columbus, Ohio). The density was then calculated using Archimedes' principal. That is, samples were cut from the foam film and first weighed dry ($m_{dry}$). The samples were then placed underwater (de-ionized water) to measure the buoyant force ($m_{buoyant}$) on the pycnometer. Using the formula below, and knowing the density of water is 1 g/cm³, we calculated the density of the foamed film samples.

$$\rho_{foam} = \rho_{water}\left(\frac{m_{dry}}{m_{dry} - m_{buoyant}}\right)$$

For each Example and Comparative Example, three specimens were tested, and the results averaged.

designation "ELITE 6960G" from Dow Chemical Company, Midland, Mich.) to the outside channel of the annular stack die. A melt temperature of 190° C. was maintained. The extruder speed for this resin was maintained at 70 revolutions per minute. Because the bubble was subsequently collapsed, and the innermost layer of the film was a pressure-sensitive adhesive, the finished film, after edge trimming of the collapsed bubble, was in effect a five layer film where the outermost (or "skin") layers were the HDPE, the center layer was the result of the joining of two layers of the pressure sensitive adhesive, and layers 2 and 4 were each the product of the merging, while in the melt, of five original layers of the EMA with expandable microspheres.

The procedure was repeated a total of three times to demonstrate process repeatability, and the three nominally identical films produced are Examples 1, 2, and 3. The finished films were 55-60 mils (1.40-1.52 mm) thick. Each film was tested for tensile properties, hardness, and density, as described above. The results are provided in Table 1, below.

TABLE 1

| Example | Max Force Downweb Newtons | Strain at Max Force Downweb % | Max Force Crossweb Newtons | Strain at Max Force Crossweb % | Shore A Hardness | Shore D Hardness | Density g/cm³ |
|---------|---------------------------|-------------------------------|-----------------------------|---------------------------------|------------------|------------------|---------------|
| 1 | 100 | 13 | 88 | 12 | 70 | 38 | 0.35 |
| 2 | 110 | 15 | 101 | 14 | 74 | 38 | 0.38 |
| 3 | 90 | 14 | 81 | 14 | 70 | 41 | 0.34 |
| 4 | 95 | 24 | 79 | 16 | 70 | 38 | 0.38 |
| A | 21 | 136 | 16 | 131 | 11 | Too Soft | 0.03 |
| B | 15 | 360 | 14 | 475 | Too Soft | Too Soft | 0.04 |
| C | 24 | 216 | 20 | 223 | 6 | Too Soft | 0.04 |
| D | 12 | 152 | 14 | 177 | Too Soft | Too Soft | n.t. |

Examples 1-3

A seven-layer film was produced using a seven-layer annular stack die (obtained under the trade designation "COEX 7-LAYER" (Type LF-400) from Labtech Engineering, Samut Prakan, Thailand). Airflow to the die was manually controlled to achieve a blow-up ratio of about 2:1. The bubble was subsequently collapsed about ten feet above die and rolled up. The feed materials were supplied by 7 independent 20 mm diameter extruders, each with about a 30:1 length to diameter ratio. A first extruder was used to melt and extrude an extrudable pressure sensitive adhesive (obtained under the trade designation "KRATON MD6748" from PolyOne, Avon Lake, Ohio) into an inside channel of the annular stack die. A screw speed of 30 revolutions per minute was used. The melt temperature was maintained at 180° C. A second, third, fourth, fifth and sixth extruder were used to feed, to the next five channels of the annular stack die, a blend of an ethylene methyl acrylate (EMA) copolymer (obtained under the trade designation "ELVALOY 1609" from Dupont, Wilmington, Del.) and a masterbatch pellet containing a 65% concentration of an expandable microsphere (obtained under the trade designation "EXPANCEL 950 MB 80" from AzkoNobel, Amsterdam, Netherlands). The blend ratio was maintained at 92% of the ethylene methyl acrylate and 8% of the microsphere masterbatch. Extruder speeds were maintained at 60 revolutions per minute. A seventh extruder was used to feed a high-density polyethylene (HDPE) resin (obtained under the trade

Example 4

The procedure employed for Examples 1-3 was repeated, with only one alteration. Instead of HDPE, the seventh extruder, and hence, the outermost channel of the annular stack die, was fed with a low-density polyethylene (LDPE) resin (obtained under the trade designation "PETROTHENE NA217000" from LyondellBasell, Houston, Tex.). Thus, the outermost (or "skin") layers of the finished five-layer film were LDPE. The film was tested for tensile properties, hardness, and density, as described above. The results are provided in Table 1, above.

Comparative Example A

Comparative Example A is a commercially available foam obtained under the trade designation "BLUE FINE CELL CROSSLINKED POLYETHYLENE FOAM #864" from Tecnifoam Inc., Circle Pines, Minn. The film was tested for tensile properties, hardness, and density, as described above. The results are provided in Table 1, above.

Comparative Example B

Comparative Example B is a commercially available foam film, obtained under the trade designation "WOODBRIDGE #SM25WH" from Woodbridge Polyurethane, Troy, Mich. The film was tested for tensile properties, hardness, and density, as described above. The results are provided in Table 1, above.

Comparative Example C

Comparative Example C is a commercially available foam film, obtained under the trade designation, "ETHYLENE VINYL ACETATE FOAM #1805" from Tecnifoam, Inc. The film was tested for tensile properties, hardness, and density, as described above. The results are provided in Table 1, above.

Comparative Example D

Comparative Example D is a commercially available foam film, obtained under the trade designation "CRUSHED/FATIGUED OPEN ETHER #6873" from Technifoam. The film was tested for tensile properties, and hardness, as described above. The results are provided in Table 1, above.

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present disclosure. Thus, it should be understood that although the present disclosure has been specifically disclosed by specific embodiments and optional features, modification and variation of the concepts herein disclosed may be resorted to by those of ordinary skill in the art, and that such modifications and variations are considered to be within the scope of embodiments of the present disclosure.

What is claimed is:

1. A polymeric multilayer material comprising:
   an adhesive layer having a first and second opposed major surfaces;
   a first foam layer having a first plurality of expandable microspheres dispersed therein and joined to the first major surface of the internal adhesive layer;
   a first skin layer that is free of the first plurality expandable microspheres in the first foam layer, and that is attached to the first foam layer to define a first external surface of the polymeric multilayer material;
   a second foam layer having a second plurality of expandable microspheres dispersed therein and joined to the second major surface of the internal adhesive layer; and
   a second skin layer that is free of the second plurality of expandable microspheres in the second foam layer, and that is attached to the second foam layer to define a second external surface of the polymeric multilayer material,
   wherein a portion of the first expandable microspheres of the first foam layer is at least partially embedded within the adhesive layer and a portion of the second expandable microspheres of the second foam layer is at least partially embedded within the adhesive layer, and
   wherein at least one of:
   the first plurality of expandable microspheres of the first foam layer is in a range from 4 wt. % to 25 wt. % of the first foam layer; or
   the second plurality of expandable microspheres of the second foam layer is in a range from 4 wt. % to 25 wt. % of the second foam layer,
   based on the total weight of the respective first and second pluralities of expandable microspheres.

2. The polymeric multilayer material of claim 1, wherein the adhesive layer comprises an adhesive in a range from 50 wt. % to 100 wt. % of the adhesive layer, based on the total weight of the adhesive layer.

3. The polymeric multilayer material of claim 2, wherein the adhesive is a pressure sensitive adhesive.

4. The polymeric multilayer material of claim 1, wherein at least one of the first foam layer or the second foam layer comprises a polymer, wherein the polymer of at least one of the first foam layer or the second foam layer is at least one of a polyethylene, a polyurethane, a polylactic acid, a polypropylene, an ethylene and methacrylate ester copolymer, or copolymers thereof.

5. The polymeric multilayer material of claim 1, wherein at least one of:
   the polymer is in a range from 70 wt. % to 96 wt. % of the first foam layer; or
   the polymer is in a range from 70 wt. % to 96 wt. % of the second foam layer,
   based on the total weight of the respective first and second foam layer.

6. The polymeric multilayer material of claim 1, wherein at least one of:
   the first plurality of expandable microspheres in the first foam layer is homogenously distributed throughout the first foam layer; or
   the second plurality of expandable microspheres in the second foam layer is homogenously distributed throughout the second foam layer.

7. The polymeric multilayer material of claim 1, wherein at least one of:
   the portion of the first plurality of expandable microspheres in the first foam layer that is at least partially embedded within the adhesive layer is in a range from 5 wt. % to 50 wt. % of the expandable microspheres of the first foam layer; or
   the portion of the second plurality of expandable microspheres in the second foam layer that is at least partially embedded within the adhesive layer is in a range from 5 wt. % to 50 wt. % of the expandable microspheres of the second foam layer.

8. The polymeric multilayer material of claim 1, wherein at least one of the first skin layer or the second skin layer comprises a polymer, wherein the polymer of at least one of the first skin layer and the second skin layer is at least one a polyethylene, a polypropylene, a polyurethane, a polylactic acid, ethylene and methacrylate ester copolymer, or copolymers thereof.

9. The polymeric multilayer material of claim 8, wherein the at least one of:
   the polymer is 70 wt. % to 100 wt. % of the first skin layer, and
   the polymer is 70 wt. % to 100 wt. % of the second skin layer,
   based on the total weight of the respective first and second skin layers.

10. The polymeric multilayer material of claim 1, wherein a density of the polymeric multilayer material is in a range from 0.20 g/cm$^3$ to 0.50 g/cm$^3$ (in some embodiments, 0.25 g/cm$^3$ to 0.35 g/cm$^3$).

11. The polymeric multilayer material of claim 1, wherein a thickness of the polymeric multilayer material is in a range from 250 micrometers to 1550 micrometers.

12. A method of forming a polymeric multilayer material, the method comprising:

coextruding a plurality of layers to form a coextruded precursor polymeric multilayer material, the plurality of layers comprising:
  a first extrudable feedstock comprising an adhesive;
  a second extrudable feedstock comprising a first polymer component, wherein 4 wt. % to 25 wt. % of the first polymer component is expandable microspheres, based on the total weight of the second extrudable feedstock; and
  a third extrudable feedstock comprising a second polymer component, wherein the second polymer component is free of the microspheres of the first extrudable feedstock;
forming an annular blown film from the coextruded precursor polymeric multilayer material; and
collapsing the annular blown film to form the polymeric multilayer material comprising:
  an adhesive layer having a first and second opposed major surfaces;
  a first foam layer having a first plurality of expandable microspheres dispersed therein and joined to the first major surface of the internal adhesive layer;
  a first skin layer that is free of the first plurality expandable microspheres in the first foam layer, and that is attached to the first foam layer to define a first external surface of the polymeric multilayer material;
  a second foam layer having a second plurality of expandable microspheres dispersed therein and joined to the second major surface of the internal adhesive layer; and
  a second skin layer that is free of the second plurality of expandable microspheres in the second foam layer, and that is attached to the second foam layer to define a second external surface of the polymeric multilayer material,
  wherein a portion of the first expandable microspheres of the first foam layer is at least partially embedded within the adhesive layer and a portion of the second expandable microspheres of the second foam layer is at least partially embedded within the adhesive layer.

13. The method of claim 12, wherein forming an annular blown film comprises passing the coextruded precursor polymeric multilayer material through an annular die.

14. The method of claim 13, further comprising pressing the collapsed annular blown film.

* * * * *

UNITED STATES PATENT AND TRADEMARK OFFICE
CERTIFICATE OF CORRECTION

PATENT NO. : 11,097,508 B2  
APPLICATION NO. : 16/347373  
DATED : August 24, 2021  
INVENTOR(S) : Jacob Young et al.

Page 1 of 1

It is certified that error appears in the above-identified patent and that said Letters Patent is hereby corrected as shown below:

In the Claims

<u>Column 21</u>
Line 42, In Claim 1, insert -- of -- after "the first plurality".

<u>Column 23</u>
Line 12, In Claim 12, insert -- expandable -- before "microspheres".
Line 12, In Claim 12, delete "first" before "extrud-" and insert -- second -- therefor.
Line 23, In Claim 12, insert -- of -- after "the first plurality".

Signed and Sealed this
Twenty-second Day of March, 2022

Drew Hirshfeld
*Performing the Functions and Duties of the*
*Under Secretary of Commerce for Intellectual Property and*
*Director of the United States Patent and Trademark Office*